United States Patent [19]

Blaszkowski

[11] 4,421,288

[45] Dec. 20, 1983

[54] SUCTION CUP

[76] Inventor: Henry Blaszkowski, P.O. Box 114, Southfield, Mich. 48034

[21] Appl. No.: 226,074

[22] Filed: Jan. 19, 1981

[51] Int. Cl.³ .............................................. F16B 47/00
[52] U.S. Cl. .................................. 248/206 R; 248/363
[58] Field of Search ............ 248/206 R, 205 R, 205 A, 248/363, 206 A

[56] References Cited

U.S. PATENT DOCUMENTS

| | | | |
|---|---|---|---|
| 2,314,803 | 3/1943 | Wagner et al. | 284/205.4 |
| 2,432,719 | 12/1947 | Braun | 248/205.4 |
| 2,451,194 | 11/1948 | Braun | 248/205.4 |
| 2,632,669 | 3/1953 | Piwczynski et al. | 248/205.5 |
| 2,936,139 | 5/1960 | Lindstrom | 248/363 |
| 3,283,888 | 11/1966 | Scott | 248/205 A |
| 3,300,173 | 1/1967 | Kennedy, Jr. | 248/205.3 |
| 3,325,639 | 6/1967 | King | 248/205.6 |
| 3,713,614 | 1/1973 | Taylor | 248/205.3 |
| 3,841,635 | 11/1974 | Wilson | 248/205.5 |
| 3,964,710 | 6/1976 | Conroy | 248/205.5 |

Primary Examiner—William H. Schultz
Assistant Examiner—Ramon O. Ramirez
Attorney, Agent, or Firm—Barnes, Kisselle, Raisch, Choate, Whittemore & Hulbert

[57] ABSTRACT

A suction cup has a flat central portion on its concave side having a layer of pressure-sensitive adhesive thereon, the layer of adhesive is covered by a stripable protective liner.

10 Claims, 6 Drawing Figures

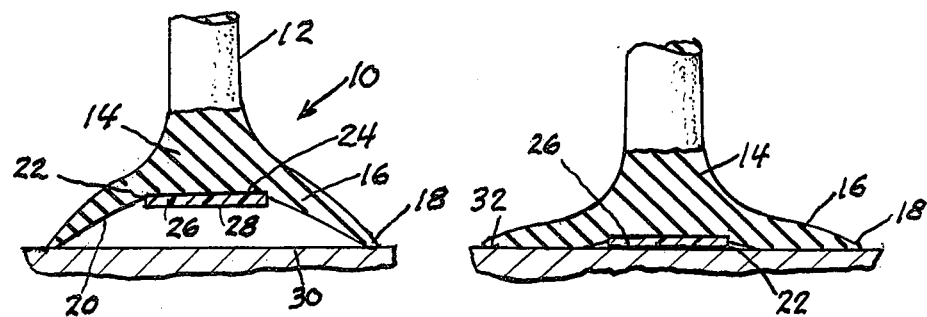
Fig. 1
Fig. 2
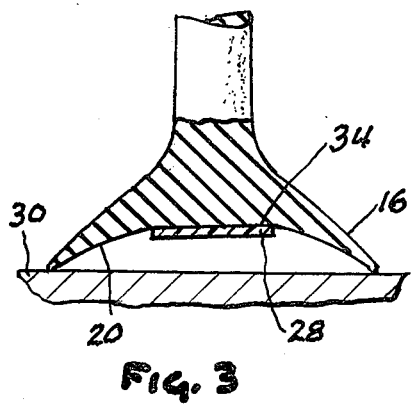
Fig. 3
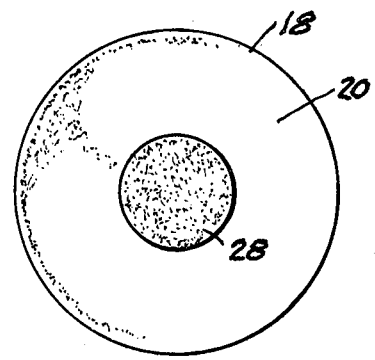
Fig. 4
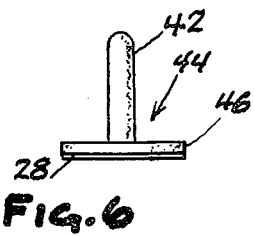
Fig. 6
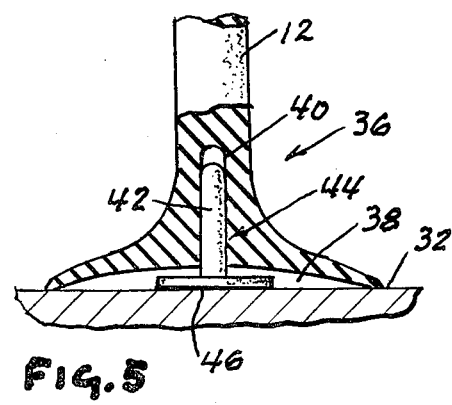
Fig. 5

SUCTION CUP

This invention relates to a suction cup.

One of the problems that arises in connection with conventional suction cups is that they will not adhere to a surface where an air tight seal cannot be maintained due to surface porosity, roughness, cracks or joints such as encountered with miniature ceramic tiles. To overcome this problem it has been suggested to apply a layer of adhesive to the concave side of the cup when such a rough or porous surface is encountered. Such an adhesive layer frequently prevents the suction cup from being reused in any manner and, in any event, interferes with the use of the suction cup on a smooth surface where suction alone is desired for adherring the cup to the surface.

It is an object of this invention to provide a suction cup adapted to be readily and securely adherred to either a smooth surface or to a rough or porous surface.

Another object of this invention is to provide a suction cup which can be removed from a rough or porous surface to which it is adhesively adherred and, thereafter, applied to a smooth surface to which it is adapted to be secured by suction.

More specifically, it is an object of this invention to provide a suction cup having a pressure-sensitive adhesive applied to only a central portion of its concave side in a manner such that on a smooth surface suction alone may be relied upon to adhere the cup to the surface and on a rough or porous surface the adhesive is instantly available for adherring the cup to the surface.

In general, the suction cup of the present invention has on its concave side a central portion to which a layer of pressure-sensitive adhesive is applied in any suitable manner. The adhesive is initially covered by a stripable protective disc which does not interfere with the use of the suction cup in a conventional manner wherein suction alone is relied upon for adherring the cup to a smooth surface but which, when stripped from the adhesive, enables the cup to be adhesively secured to a rough or porous surface.

Other objects, features and advantages of the present invention will become apparent from the following description and accompanying drawings, in which:

FIG. 1 is a fragmentary sectional view of one form of suction cup according to the present invention;

FIG. 2 shows the suction cup illustrated in FIG. 1 applied to a mounting surface;

FIG. 3 shows another form of suction cup according to the present invention;

FIG. 4 is a bottom plan view of the suction cup shown in FIGS. 1 or 3;

FIG. 5 is a sectional view of another form of suction cup according to the present invention; and FIG. 6 is an elevational view of the insert shown in FIG. 5.

The suction cup 10 shown in FIG. 1, as is the case with conventional suction cups, is formed of a soft resiliently flexible material, such as rubber, plastic, etc. It is preferably formed with a central stem 12 suitably attached to or formed integrally with an inverted cup 14. Cup 14 has an annular skirt 16 depending from the lower end of stem 12 and flaring in a radially outward direction. The central portion of cup 14 is a relatively heavy section. However, skirt 16 is tapered in thickness so that it becomes progressively thinner in a radially outward direction and terminates in a peripheral edge 18 which is very thin. The concave face 20 of cup 14 in the embodiment illustrated in FIG. 1 has a circular recess 22 at the central portion thereof. The diameter of recess 22 is relatively small and preferably less than half the diameter at the edge 18 of the cup in its free condition. Recess 22 preferably has a flat bottom wall 24 which lies in a plane generally perpendicular to the axis of stem 12 and, thus, parallel to the surface defined by the peripheral edge 18. Within recess 22 there is arranged a double-faced adhesive disc 26. In one form of the invention disc 26 is formed from a strip or tape of compressible foam material which enables it to readily conform to irregular surfaces. In any event, the lower face of disc 26 has a layer of pressure sensitive adhesive applied thereto. This adhesive layer is not shown in FIG. 1. However, a readily strippable protective disc or liner 28 is applied to the exposed face of the adhesive layer. The adhesive on the opposite or upper face of disc 26 is of a type suitable for adherring disc 26 to the material of which the suction cup 14 is formed. Disc 26 has a thickness preferably at least slightly greater than the depth of recess 22. While the provision of a recess such as shown at 22 is preferred, it is not essential. If desired, disc 26 can be secured directly to the slightly concave central portion of a suction cup.

When it is desired to apply the suction cup 10 to a generally flat smooth surface, it is manipulated in the manner of a conventional suction cup by merely pressing it against the smooth surface, designated 30 in FIG. 1, so as to flatten out the annular skirt 16 and enable the suction cup to adhere to the smooth surface by suction alone. When used in this manner the cover disc or liner 28 is not removed. However, since the disc 26 is located at the central portion of the concave face of the cup when the annular skirt 16 is flattened out against a smooth flat surface, the disc 26 does not interfere with the normal use of the suction cup and does not impair or diminish the degree of suction obtainable with the cup. This is true even if the disc 26 is adherred directly to the slightly concaved underside of the suction cup.

FIG. 2 shows the suction cup illustrated in FIG. 1 secured to a rough or porous surface 32. When such a surface is encountered the protective liner 28 is stripped from the bottom face of disc 26 and the cup is pressed against the surface so as to flatten out the annular skirt 16. In this connection it will be observed that the now exposed pressure sensitive adhesive surface on the bottom face of the disc does not contact the surface 32 until the major portion of skirt 16 has been distorted to a position where it is in substantially coplanar relation with the surface 32. Thus, disc 26 does not interfere in any manner with the necessity for the skirt 16 to spread or flatten out to its increased diameter, as would be the case if the adhesive were applied to a major portion of or substantially the entire concave face of the cup. When the concave surface 20 of skirt 16 is deformed to the condition shown in FIG. 2 where it is in coplanar engagement with the rough or porous surface 32, the exposed adhesive surface of disc 26 contacts the surface 32 and thereby adhesively secures the suction cup to the surface. If disc 26 is secured to a flat central portion of the suction cup the entire exposed face of the disc will become adhesively secured to the mounting surface. If disc 26 bears against a slightly concave surface at the central portion of the suction cup, its peripheral edge portion will adhere to the mounting surface. In either event, it will be appreciated that the outer peripheral edge 18 of the suction cup is in tension and will hug the underlying surface 32 around the periphery of skirt 16. Since the peripheral edge 18 is relatively thin and flexible, it will tend to seal with and blend smoothly into the underlying and surrounding portion of the surface 32. This not only provides a pleasing appearance, but also avoids the formation of crevices and deep corners around the periphery of skirt 16 which would be difficult to clean.

The arrangement shown in FIG. 3 differs from that illustrated in FIGS. 1 and 2 in that, instead of utilizing an adhesive disc 26 within a recess 22, a thin layer of pressure sensitive adhesive is applied directly to a small, preferably flat, central portion 34 on the concave face of the suction cup. As is the case with the embodiment illustrated in FIG. 1, this adhesive layer is at least initially covered by the strippable protective disc 28, the thickness of which is shown highly exaggerated in FIG. 3. The suction cup shown in FIG. 3 is used in exactly the same manner as previously described with respect to FIGS. 1 and 2. When the underlying surface to which the cup is to be attached is flat and smooth, liner 28 is left intact and the suction cup is used in the conventional manner. When the underlying surface is porous or rough, liner 28 is removed and the suction cup is adhesively secured to the mounting surface in the same manner as described in connection with FIG. 2. Maximum adhesion is obtained when the small central portion 34 is flat.

In the event the suction cup is formed of a material to which pressure sensitive adhesive will not readily adhere, the central portion of the cup may be coated with a primer or other adhesive, such as a film of cyanoacrylate adhesive. If a cyanoacrylate adhesive is used, it can be utilized to adhere the disc 26 directly on the suction cup or to merely render the surface of the suction cup receptive to a pressure sensitive film.

The suction cup designated 36 in FIG. 5 in its free uncompressed condition assumes the same configuration as the cups shown in FIGS. 1 and 3. At the central portion of the concave side of cup 36 the cup is formed with a small diameter bore 40 extending upwardly therefrom toward or into stem 12. The diameter of bore 40 is preferably dimensioned to receive with a frictional fit a cylindrical stud 42 of a plastic insert 44 formed integrally with a circular disc 46 at the lower end thereof. Insert 44 is preferably molded from a relatively rigid plastic material and disc 46 has a layer of pressure sensitive adhesive applied thereto which is covered by a protective liner 28 as previously described. The use of an insert such as shown at 44 is desirable in the event that the material from which the suction cup is formed is incompatible with conventional pressure sensitive adhesives. This eliminates the problem of treating the surface of the suction cup so as to accept the adhesive layer such as shown in FIG. 3 or the adhesive disc shown in FIG. 1.

When it is desired to apply the suction cup shown in FIG. 5 to a smooth surface, insert 44 need not be utilized and the cup 36 may be used in the manner of a conventional suction cup. If it is desired to apply cup 36 to a rough or porous surface, the protective liner 28 is first stripped from the adhesive on the bottom face of disc 46 and the disc is adhesively secured to the desired mounting surface. Thereafter the suction cup is telescoped over the insert and pressed toward the mounting surface to cause stem 42 to frictionally engage bore 40. The suction cup is telescoped over stem 42 to a depth such that the outer peripheral edge of the suction cup skirt engages the mounting surface. When the cup engages the mounting surface in this manner the space between the bottom face of the suction cup and the underlying portion of the mounting surface will be defined by the recess designated 38 in FIG. 5. If desired, the concave face of the cup can be initially molded with a flat central recess to receive disc 46 in a manner similar to recess 22 shown in FIG. 1. In any event, it is not absolutely essential that the insert 44 be removed when the suction cup is to be retained on a surface by suction alone. When the cup is retained on a mounting surface by suction and the insert is not removed, the cup is pressed against the mounting surface to a position wherein it is in a generally flattened condition, in which case recess 38 would be very small as compared to its size as shown in FIG. 5. Likewise, since insert 44 may be adhesively secured to a mounting surface before the suction cup is engaged therewith, the adhesive used for securing it to a mounting surface need not be of the pressure sensitive type. If other than a pressure sensitive adhesive is utilized to secure the insert to a mounting surface, the suction cup is engaged with the mounting insert after the adhesive has set.

I claim:

1. A suction cup formed of a resiliently flexible material and having an upwardly concave side, said concave side having a generally flat central portion surrounded by a depending outwardly flaring annular skirt which forms the major portion of the concave side of the cup, said central portion having a pressure sensitive adhesive surface with an overlying strippable cover sheet thereon, the outer flat face of said cover sheet lying in a plane closely adjacent the surrounding portion of the concave side of the cup so that when the cup, said adhesive surface being substantially flush with the inner face of the suction cup is pressed firmly against a flat face the annular skirt is adapted to be flattened into coplanar relation with the cover sheet (or said adhesive surface if the cover sheet is removed) whereby a minimum of air is trapped between the suction cup and said flat surface and as a result thereof the degree of suction obtainable with the cup is not diminished by the presence of said adhesive surface with or without the cover sheet.

2. A suction cup as called for in claim 1 wherein said adhesive surface comprises the outer surface of a thin resiliently compressible disc secured to said central portion of the cup, said disc being adapted to be compressed to a thinner thickness when the cup is pressed firmly against said flat support surface as described to thereby decrease to a minimum the air trapped between the annular skirt and said flat surface.

3. A suction cup as called for in claim 2 wherein said disc is a piece of foam tape.

4. A suction cup as called for in claim 3 wherein said central portion is recessed and said piece of foam tape is seated in said recess.

5. A suction cup as called for in claim 4 wherein the recess has a depth at least slightly less than the thickness of the foam tape.

6. A suction cup as called for in claim 1 wherein said central portion comprises a flat rigid disc secured to the concave edge of the cup.

7. A suction cup as called for in claim 6 wherein the concave side of the cup is formed with a central recess and said disc is frictionally retained in said recess.

8. A suction cup formed of a resiliently flexible material and having an upwardly concave side, said concave side having a central portion surrounded by a depending outwardly flaring annular skirt, the concave side of the cup having a small diameter central bore therein extending axially in a direction away from the concave side of the cup and a generally rigid insert having a stem adapted to be frictionally and slideably engaged with said bore, said insert having a flat disc at the lower end of said stem, the bottom face of the disc having an adhesive surface applied thereto, said bore and stem being sized so that when said disc is adhesively secured to a flat support surface the suction cup can be telescoped over the stem to frictionally engage the stem with said bore and thereby support the cup on said support surface.

9. A suction cup as called for in claim 8 wherein said bore is closed at the end thereof remote from the concave side of the cup so that the cup can be used in the manner of a conventional suction cup when the insert is not engaged with said bore.

10. A suction cup as called for in claim 9 wherein said bore has a length at least equal to the length of the stem so that the cup can be fully telescoped over said stem and pressed against said support surface to a position wherein said annular skirt is in a generally flattened condition against said support surface.

* * * * *

UNITED STATES PATENT AND TRADEMARK OFFICE
CERTIFICATE OF CORRECTION

PATENT NO. : 4,421,288
DATED : December 20, 1983
INVENTOR(S) : BLASZKOWSKI, Henry It is certified that error appears in the above-identified patent and that said Letters Patent are hereby corrected as shown below:

Column 4, Cancel lines 34 thru 36 inclusive and insert in place thereof -- concave side of the cup, said adhesive surface being substantially flush with the inner face of the suction cup so that when the cup is pressed firmly against a flat face the --

Signed and Sealed this

Twenty-sixth Day of February 1985

[SEAL]

*Attest:*

DONALD J. QUIGG

*Attesting Officer*     *Acting Commissioner of Patents and Trademarks*